Jan. 19, 1971  H. A. JAHNLE  3,555,876
LAMINATED MOLDING TOOL MADE OF A COMPOSITE METAL
Filed Dec. 23, 1968

INVENTOR
HERBERT A. JAHNLE

BY *Edward M. Farrell*

ATTORNEY

United States Patent Office 3,555,876
Patented Jan. 19, 1971

3,555,876
LAMINATED MOLDING TOOL MADE OF
A COMPOSITE METAL
Herbert A. Jahnle, Havertown, Pa., assignor to The Budd
Company, Philadelphia, Pa., a corporation of Pennsylvania
Filed Dec. 23, 1968, Ser. No. 785,878
Int. Cl. B21c 3/16
U.S. Cl. 72—476         8 Claims

ABSTRACT OF THE DISCLOSURE

A laminated molding tool especially adapted for punch molding comprising a molding surface layer of nickel intimately bonded to a supporting substrate comprising an alloy of aluminum, copper and, optionally silicon, which substrate imparts rigidity and strength to the molding surface layer.

---

Figure 1:
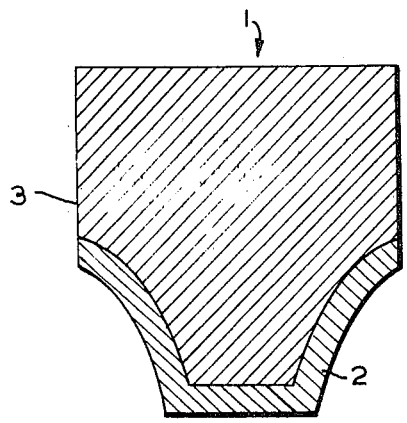

Recently, molding tools having a nickel molding surface have come into wide use. These molding tools take the form of male, convex punch molds or female concave molds. A wide variety of shaped plastic and metal articles may be formed utilizing these punches and molds. Nickel is a desirable molding surface for these tools due to its availability, strength, thermal properties, etc. More recently, electroforming methods have been developed for manufacturing these nickel punches and molds. Generally, the molding tools are formed by electrodepositing nickel over a removable mandrel composed of a reinforced plastic, cast of machined metal in the shape of the desired molding tool. The mandrel is then removed from the electrodeposited nickel layer, yielding a molding surface in the desired shape.

It has also been proposed to back-up or support the electrodeposited nickel molding surface layer with an inexpensive reinforcing material to provide substance, strength and thermal properties thereto. Several bothersome problems have arisen, however, in connection with providing a suitable supporting substrate for nickel molding surfaces. These reinforcing or supporting substrates are generally laminated or bonded to the nickel molding surface by pouring the reinforcing material into the formed nickel mold in molten form and allowing the composite tool to cool. If the melting temperature of the reinforcing material is too high, however, the nickel molding surface layer will melt and deform when the molten reinforcing material is poured therein. Moreover, if the melting point of the reinforcing material is too low, the number of uses to which the supported nickel molding tool can be put is severly limited. That is, in many molding operations, the punch or mold tool is subjected to extreme temperatures. If the reinforcing material has too low a melting point, the tool may be deformed due to melting of the reinforcing material during such elevated temperature molding operations.

In addition to having thermal properties compatible with the nickel molding surface and high temperature molding operations, it is necessary that the reinforcing material have a high degree of strength in order to properly reinforce the nickel molding surface during the molding operation. This is particularly true with respect to male or convex punch molds wherein the tools are subjected to a high degree of compression. It is necesary not only that the reinforcing material have a high degree of compressive strength in order to avoid deformation of the tool during molding operations, but also that it not be brittle in order to avoid chipping or cracking of the tool during operation.

Moreover, it is necessary that the reinforcing material have good wetting and bonding properties with respect to the nickel molding surface layer. In other words, the reinforcing material must be selected so that upon cooling of the molten material after it has been inserted in the nickel molding surface, a strong bond will result between the reinforcing material and the nickel molding surface in order to avoid subsequent delamination during the molding operation to which it is subjected.

Heretofore, reinforcing or supporting substrates for nickel, particularly electrodeposited nickel molding surfaces, having melting points compatible with nickel and the intended molding operation, good mechanical strength, particularly compressive strength and satisfactory wetting and bonding characteristics have been unavailable.

It is an object of the present invention to provide a laminated molding tool comprising a nickel molding surface layer intimately bonded to a thermally conducting, supporting substrate which imparts rigidity and strength to said nickel molding surface layer.

It is a further object of the present invention to provide a molding tool comprising a nickel molding surface laminated to a supporting substrate wherein the material comprising said supporting substrate has a melting point compatible with the melting point of nickel and high temperature molding operations.

It is a further object of the present invention to provide a laminated molding tool comprising a nickel molding surface bonded to a supporting substrate wherein the material comprising said supporting substrate has a high degree of mechanical strength, particularly, compressive strength.

It is a further object of the present invention to provide a molding tool comprising a nickel molding surface bonded to a supporting substrate wherein the material comprising said supporting substrate is intimately and strongly bonded to said nickel molding surface.

It has been found that these and other objects may be realized according to the present invention by utilizing as a supporting substrate for a nickel molding surface in a laminated molding tool of an alloy of aluminum, copper and, optionally, silicon wherein the amount of copper is in the range of from about 28% to about 36% by weight and the amount of silicon is in the range of from about 5% to about 8% by weight, said percentages being based on the weight of the alloy.

It has been found that the above-described alloy combines the best properties of melting point, mechanical strength and lamination to nickel surfaces.

Molding tools comprising nickel, particularly electrodeposited nickel, laminated to supporting substrates comprising the above-described alloys have a high degree of mechanical strength and may be utilized in any molding operation in which nickel molds are conventionally employed while avoiding delamination, cracking, chipping, etc. of the molding tool.

Figure 2:
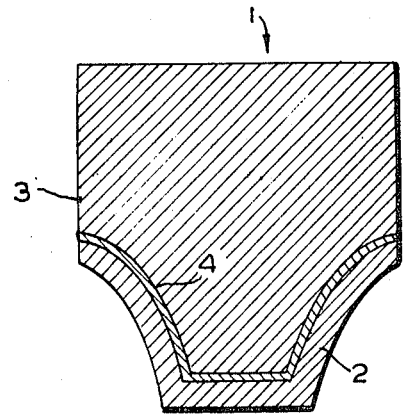
Figure 3:
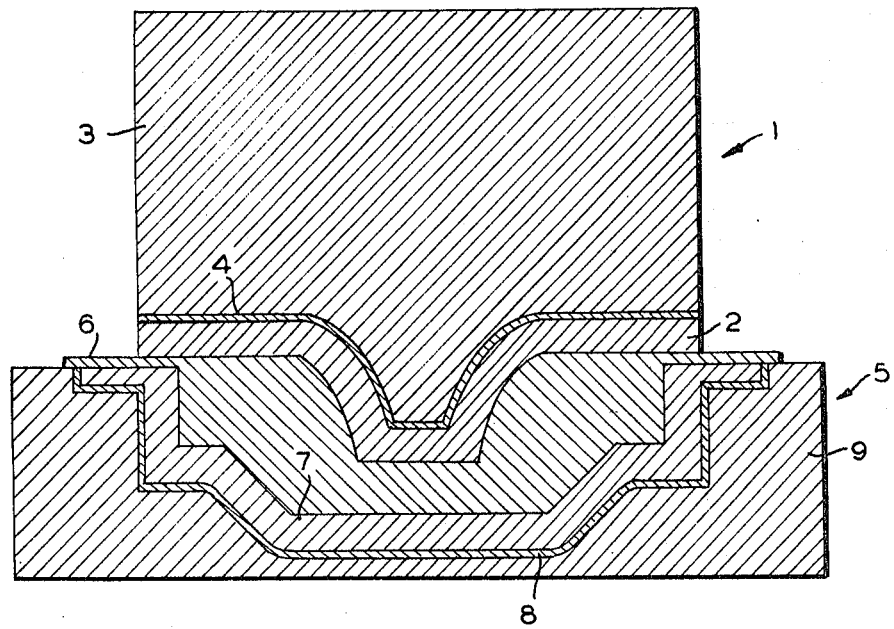

Other objects, features and advantages of the invention will be apparent from the following detailed description and the accompanying drawings, which are illustrative only in which FIGS. 1 and 2 show convex, male molding tools in accordance with the invention; and FIG. 3 depicts a molding operation employing a convex, male molding tool and a female, concave mold of the invention.

With reference to the drawings, the molding tools 1 and 5 comprise nickel, preferably electrodeposited nickel, molding surfaces 2 and 7 intimately bonded to supporting and reinforcing substrates 3 and 9 comprising the above-described alloys. Optionally, interlayers 4 and 8 of copper may be interposed between and intimately bonded to the molding surfaces 2 and 7 and supporting substrates 3 and 9. These copper interlayers are provided in the molding tool to enhance the bond between the nickel molding surface and the reinforcing material. It is to be understood that the copper interlayer is only an optional feature of the invention. The alloys comprising the support substrate form sufficiently strong laminates with the nickel molding surface layers for most conventional operations. The copper interlayers may be interposed in the tool where the latter is subjected to extremely rigorous molding operations.

In FIG. 3, a male, convex molding tool 1 and a female, concave mold 5 are depicted. In a typical operation, the material 6 to be molded, i.e., plastic, metal, etc., is placed in the concave mold 5. The desired molded article is formed by punching or stamping the material contained in the concave mold 5 with the convex molding tool 1. Alternatively, the molds of the invention may be employed in conventional injection molding operations.

As will be apparent, many of such molding operations are carried out at extremely elevated temperatures. Accordingly, it is necessary that the reinforcing materials 3 and 9 of the convex and concave molds respectively, have sufficiently high melting points to withstand these temperatures without melting and/or deforming, thereby resulting in damage to the molds. On the other hand, it is necessary that the reinforcing material have a sufficiently low melting point in order that it may be poured in molten form into the nickel molding surface layer without melting and/or deforming the latter. The alloy reinforcing materials of the present invention have melting points and thermal properties compatible with the nickel molding surfaces with which they are laminated and, further, which are compatible with the temperatures encountered in most molding operations.

The melting point of nickel is approximately 2647° F. Obviously, the melting point of the alloy reinforcing material must be below this melting point of nickel. As cautioned above, however, the melting point of the reinforcing material must be above the temperatures normally encountered during molding operations. Practically, reinforcing materials having a melting point below 750° F. are generally undesirable. Accordingly, the alloy reinforcing materials of the present invention have melting points in the range of from about 750° F. to below about the melting point of nickel. The preferred backing or reinforcing, support material of the present invention comprises an aluminum alloy which includes aluminum, about 32% by weight of copper and about 6% by weight of silicon. This alloy has a melting point of approximately 950° F. thereby rendering it suitable for pouring in molten form into a formed nickel molding surface layer without melting and/or deforming the latter and, also, suitable for inclusion in a molding tool which is employed in molding operations conducted at elevated temperatures. It is to be understood, however, that the percentage of copper in the alloy may range from about 28% to about 36% by weight and that the amount of silicon may be varied from about 5% to about 8% by weight. If these percentages are increased or decreased below the stated ranges, the melting point of the alloy tends to rise, thereby rendering it unsuitable for a supporting substrate for nickel molding surfaces.

Furthermore, although any of the alloys defined by the recited percentages ranges may be employed in the molds of the present invention, the preferred alloy (32% of copper and 6% of silicon) has been found to form an extremely strong bond or laminate with the nickel molding surface and to constitute a reinforcing material having a high degree of mechanical strength, particularly, compressive strength.

The following is a representative process whereby the molding tools of the present invention may be prepared. A nickel molding surface is electrodeposited over a removable mandrel having a shape conforming to the desired configuration of the resulting mold in a known manner. Following completion of the electrodeposition, the mandrel is removed from the electrodeposited nickel molding surface. Although the electrodeposition process is applicable to and while understanding that the present invention contemplates the formation of concave, female molds, the electrodeposition process is more adaptable to the deposition of metal on convex surfaces than on concave surfaces. The nickel may be electrodeposited to any desired thickness. Generally, thicknesses from about 0.0005 inch to 0.5 inch are electrodeposited. Following removal of the mandrel, the nickel molding surface is supported and molten reinforcing material is poured therein. Preferably, the nickel molding shell is first placed in a furnace and preheated generally to a temperature just below the melting point of the reinforcing alloy to be added. Also, preferably the nickel shell is first coated with a thin layer of copper in order to improve the resulting bond between the reinforcing material and the nickel shell. Further, a conventional flux material (e.g., powdered aluminum-silicon brazing alloy), is preferably coated over the copper coating to enhance the bonding operation. The reinforcing alloy in molten form is then poured into the coated shell. After allowing the composite mold to cool, the laminated molding tool is removed and is ready for molding operations without further treatment. The preferred alloy reinforcing material of the present invention contains from 5% to about 8% of silicon. It is to be understood, however, that alloys of aluminum and copper containing from 28% to 36% of copper and from 0–4% of silicon may also be employed. For example, an alloy of aluminum and copper containing 33% by weight of copper has a melting point of 1000° F. and results in a supporting or back-up material for the nickel molding surface of extremely high compressive strength. The fluidity of the above-described alloy, however, is such that where the resulting mold surface is irregularly contoured, the material may not completely fill the nickel shell without a great deal of mechanical manipulation. However, for relatively flat or level molding surfaces, the alloy is quite suitable. By adding silicon to the alloy, the fluidity of the latter is greatly improved, thereby enabling the formation of extremely complex molding tools in an efficient manner.

The following illustrative example is set forth; however, it is to be understood that the invention is not limited to the embodiment illustrated therein but rather is defined by the appended claims.

EXAMPLE

The alloys set forth in Table I were prepared according to conventional techniques and employed as backing materials for electroformed nickel shells as follows:

Eight nickel shells in the form of cups and tubes were electroformed over a removable mandrel according to conventional methods. In 4 of the shells electroformed copper coatings were provided by conventional methods. The shells were insulated and pre-heated in ovens to temperatures just below the melting points of the alloys listed in Table I. The interior of the shells were preliminarily coated with a paste of Handy Alumibraze, a powdered aluminum-silicon brazing and fluxing mixture conventionally employed to join aluminum parts. Samples of the alloys listed in Table I were melted and poured into the shells at the temperatures indicated in Table I. A sample of each alloy was poured into both a nickel shell and a copper coated nickel shell.

TABLE I

| Alloy | Melting Point,° F. | Pouring temp.,° F. |
|---|---|---|
| (1.) Cu-Ni(3.5–5.5%)-Zn(24–27%)-P(3.5–5.5%)* | 1,400–1,450 | 1,600–1,650 |
| (2.) Commercially pure aluminum | 1,220 | 1,400 |
| (3.) Al-Si(12%) | 1,060 | 1,200 |
| (4.) Al-Cu(33%) | 1,018 | 1,200 |
| (5.) Al-Cu(32%)-Si(6%) | 950 | 1,200 |

* Cu-Ni-Zn-P is a conventional backing alloy.

The mechanical properties of the cooled nickel shells containing the alloys of Table I are set forth in Table II.

TABLE II

| Alloy | Compressive yield P5 | Hardness RB |
|---|---|---|
| (1.) Cu-Zn-Ni-P | | 89 |
| (2.) Al | 5,000 | |
| (3.) Al-Si(12%) | 13,000 | 80 |
| (4.) Al-Cu(33%) | 40-43,000 | 80 |
| (5.) Al-Cu(32%)-Si(6%) | 44-49,000 | 85 |

As is apparent from the results set forth in Tables I and II, the Al-Cu and Al-Cu-Si alloys of the present invention combine the best properties of melting point, strength and hardness.

The Cu-Zn-Ni-P alloy was found to be unsatisfactory as a backing material as the degree of wetting was difficult to control. Either no wetting occurred or the nickel shell was locally consumed.

Machining of the compression specimens indicated that the alloys of the invention are readily machineable to a high finish.

The resulting specimens were examined and mounted to form molds in a hydraulic press which was closed at 80,000 pounds. Hot Plexiglas was forced into the molds at 25,000 p.s.i. to simulate injection molding.

Whereas the Cu-Zn-Ni-P alloy, Al-Si alloy and Al backed molds were deformed by the molding operation, the Al-Cu and Al-Cu-Si alloy backed molds of the invention functioned satisfactorily and were not deformed by the compression and elevated temperatures endured during the molding operation.

What I claim is:

1. A laminated molding tool comprising a molding surface layer intimately bonded to a thermally conducting supporting substrate, which imparts rigidity and strength to said surface layer, said molding surface layer comprising nickel and said supporting substrate comprising an alloy of aluminum and copper wherein the amount of copper is in the range of from about 28% to about 36% by weight, based on the weight of said alloy.

2. The molding tool of claim 1 wherein said alloy additionally contains from about 5% to about 8% by weight of silicon based on the weight of said alloy.

3. The molding tool of claim 2 wherein said alloy comprises about 32% by weight of copper and about 6% by weight of silicon.

4. The molding tool of claim 1 having an interlayer of copper interposed between and intimately bonded to said molding surface layer and said supporting substrate.

5. The molding tool of claim 1 wherein said molding surface layer comprises electrodeposited nickel.

6. A male, laminated molding tool especially adapted for punch molding, consisting essentially of a substantially convex molding surface layer intimately bonded to a thermally conducting supporting substrate which imparts rigidity and strength to said surface layer, said convex molding surface layer consisting essentially of electrodeposited nickel and said supporting substrate consisting essentially of an alloy of aluminum, copper and silicon wherein the amount of copper is in the range of from about 28% to about 36% by weight and the amount of silicon is in the range of from about 5% to about 8% by weight of silicon, said percentages being based on the weight of said alloy.

7. The male molding tool of claim 6 wherein said alloy contains about 32% by weight of copper and about 6% by weight of silicon.

8. The male molding tool of claim 7 having an interlayer of copper interposed between and intimately bonded to said electrodeposited nickel molding surface layer and said supporting substrate.

References Cited

UNITED STATES PATENTS

| | | | |
|---|---|---|---|
| 627,289 | 6/1899 | Bennett | 72—476 |
| 1,789,455 | 1/1931 | Spackman | 72—476 |
| 2,837,818 | 6/1958 | Storeheim | 29—194 |
| 3,044,156 | 7/1962 | Whitfield | 29—197 |
| 3,046,640 | 7/1962 | Singleton | 29—197 |

HYLAND BIZOT, Primary Examiner

U.S. Cl. X.R.

29—194, 197